(12) United States Patent
Tagawa et al.

(10) Patent No.: US 8,932,194 B2
(45) Date of Patent: Jan. 13, 2015

(54) ELECTRICALLY CONDUCTIVE ROLLER

(75) Inventors: Hirotaka Tagawa, Yokohama (JP); Kota Kawano, Yokohama (JP); Takayuki Sugimura, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 914 days.

(21) Appl. No.: 12/599,634

(22) PCT Filed: May 8, 2008

(86) PCT No.: PCT/JP2008/058557
§ 371 (c)(1),
(2), (4) Date: Nov. 10, 2009

(87) PCT Pub. No.: WO2008/140020
PCT Pub. Date: Nov. 20, 2008

(65) Prior Publication Data
US 2011/0124478 A1 May 26, 2011

(30) Foreign Application Priority Data

May 11, 2007 (JP) .................. 2007-126658
Aug. 23, 2007 (JP) .................. 2007-217345

(51) Int. Cl.
G03G 15/02 (2006.01)
C08G 18/10 (2006.01)
C08G 18/40 (2006.01)
G03G 15/08 (2006.01)
G03G 15/16 (2006.01)
G03G 15/20 (2006.01)

(52) U.S. Cl.
CPC ............ *G03G 15/0233* (2013.01); *C08G 18/10* (2013.01); *C08G 18/4018* (2013.01); *G03G 15/0818* (2013.01); *G03G 15/1685* (2013.01); *G03G 15/2053* (2013.01)
USPC .................................. 492/53; 492/56; 492/25

(58) Field of Classification Search
CPC ............ F16C 13/00; G03G 15/0233; G03G 15/0818; G03G 2215/025; G03G 2215/2058–2215/2067; G03G 2215/00683; G03G 15/2057
USPC .............................. 492/53, 56, 25
See application file for complete search history.

(56) References Cited

U.S. PATENT DOCUMENTS 5,017,965 A 5/1991 Hashimoto et al.
2002/0119324 A1* 8/2002 Harashima et al. ........ 428/423.3
(Continued)

FOREIGN PATENT DOCUMENTS

JP 03-038663 A 2/1991
JP 05-125209 A 5/1993
(Continued)

*Primary Examiner* — Christopher Besler
(74) *Attorney, Agent, or Firm* — Sughrue Mion, PLLC

(57) ABSTRACT

An electrically conductive roller which may easily obtain a desired surface roughness, and which has good setting property without problems such as high cost and compression set is provided.

An electrically conductive roller 10 comprises a shaft 1, an elastic layer 2 supported on the periphery of the shaft and one surface layer 3 formed on the peripheral surface of the elastic layer 2. The elastic layer 2 is composed of a urethane foam in which the degree of swelling is not more than 120% with respect to the solvent used in the formation of the surface layer 3. The urethane foam preferably contains, as a polyol component, a polyester polyol having a hydroxyl value of 200 to 400 and 3 or more functional groups.

4 Claims, 1 Drawing Sheet

(56) References Cited

U.S. PATENT DOCUMENTS

| | | | |
|---|---|---|---|
| 2004/0152575 A1* | 8/2004 | Kaji et al. | 492/56 |
| 2007/0003331 A1 | 1/2007 | Kawano et al. | |
| 2007/0037680 A1* | 2/2007 | Tagawa et al. | 492/56 |

FOREIGN PATENT DOCUMENTS

| | | |
|---|---|---|
| JP | 06-016301 A | 1/1994 |
| JP | 06-301267 A | 10/1994 |
| JP | 09-171309 A | 6/1997 |
| JP | 2002-347199 A | 12/2002 |
| JP | 2004-078071 A | 3/2004 |
| JP | 2005-316123 A | 11/2005 |
| JP | 2006-227529 A | 8/2006 |
| JP | 2006-301344 A | 11/2006 |
| JP | 2006-301512 A | 11/2006 |
| JP | 2006-349740 A | 12/2006 |
| JP | 2006-349741 A | 12/2006 |

* cited by examiner

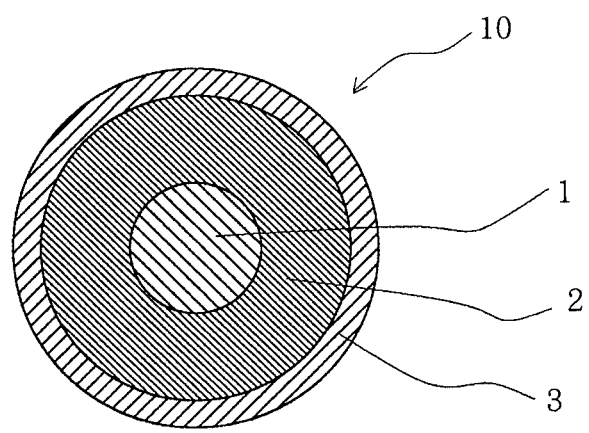

ELECTRICALLY CONDUCTIVE ROLLER

TECHNICAL FIELD

The present invention relates to an electrically conductive roller (hereinafter also referred to as simply "roller"), more particularly, to an electrically conductive roller employed in image forming apparatuses using an electrophotographic method such as copier, printer or the like.

BACKGROUND ART

In image forming apparatuses using an electrophotographic method such as copier, printer or the like, roller members provided with electrical conductivity are employed in electrophotographic processes such as developing, charging, transferring (providing toner, cleaning) and the like.

Conventionally, as electrically conductive rollers used as the developer rollers, charge rollers, transfer rollers (for providing toner, or cleaning) or the like, those having, as a basic structure, a structure in which an electrically conductive elastic layer comprising an electrically conductive rubber, polymeric elastomer, polymeric foam and/or the like provided with electrical conductivity by blending an electrically conductive agent on the periphery of a shaft is formed, and provided with one or more coating layers on the periphery of the elastic layer to obtain desired surface roughness, electrical conductivity, hardness and/or the like are used.

Here, although, for example, with the surface of an elastic layer made of urethane solid material, a desired surface roughness may be obtained by forming one coating layer on the surface, in the case of an elastic layer made of urethane foam, the surface roughness cannot be controlled unless the surface of the elastic layer is sealed with a water-based coating because a solvent-based coating causes problems such as melting of the surface of the elastic layer since the surface of the foam has open cells. Since there is a problem in, for example, that rough printed images are produced or a toner filming is caused when the surface roughness is not controlled, conventionally, in the case of the elastic layer made of urethane foam, a method of adjusting the surface roughness by dip coating with water-based coating for about 2 to 6 times before coating a solvent-based coating has been used.

As for improvements in electrically conductive rollers, for example, a charging member in which the vapor permeability and the degree of water swelling of a moisture-permeable polyurethane resin used for the surface layer are defined as predetermined amounts is disclosed in Patent Document 1.
Patent Document 1: Japanese Unexamined Patent Application Publication No. H6-301267 (claims, and the like)

DISCLOSURE OF THE INVENTION

Problems to be Solved by the Invention

However, among the above, the elastic layer made of urethane solid material has a drawback in that the layer is apt to get sharp contact marks although it is easy to adjust the surface roughness or the like. In the case of the elastic layer made of urethane foam, although it is possible to control the surface roughness to a desired level by sealing the open cells on the surface of the layer with a water-based coating in the same way as described above, there arises a problem in that the cost of coating material increases because it is necessary to add a water-based coating for a plurality of times. The layer also has a problem that the production equipment is costly due to complicated production process because of increased number of steps of a dipping process as well as the fraction defective increases due to the increased number of steps of a coating process, and a problem that the setting property of the roller deteriorates because the thickness of the water-based coating layer which has poor compression set increases.

Accordingly, the object of the present invention is to provide an electrically conductive roller which overcomes the above-described drawbacks, which may easily obtain a desired surface roughness, and which has good setting property without problems such as high cost and compression set.

Means for Solving the Problem

The present inventors intensively studied to discover that the above-described drawbacks will be overcome by forming the elastic layer of the electrically conductive roller by using urethane foam whose degree of swelling with respect to a solvent used for a coating for the surface layer formed on the peripheral surface of the roller is not more than a predetermined amount, thereby completing the present invention.

That is, the electrically conductive roller of the present invention is an electrically conductive roller comprising a shaft, an elastic layer supported on the periphery of the shaft and one surface layer formed on the peripheral surface of the elastic layer, wherein the elastic layer is composed of a urethane foam whose degree of swelling with respect to a solvent used for the formation of the surface layer is not more than 120%.

The urethane foam of the present invention preferably contains, as a polyol component, a polyester polyol having a hydroxyl value of 200 to 400 and 3 or more functional groups, and the content of the polyester polyol in the polyol component of the urethane foam is preferably within a range of 10 to 60% by weight. The thickness of the surface layer is preferably within a range of 5 to 24 µm.

Effects of the Invention

The above-described constitution of the present invention has made it possible to provide an electrically conductive roller which may easily obtain a desired surface roughness and having good setting property without having conventional problems such as high cost and compression set. As mentioned above, although Patent Document 1 discloses a roller in which the degree of swelling with respect to water of the surface layer is defined, there is no description of the degree of swelling of the elastic layer at all. The present invention addresses the problem of swelling of the elastic layer by a solvent used in forming a surface layer on the elastic layer. When the degree of swelling of the elastic layer comprising urethane foam by the solvent is not taken into consideration, it is difficult to control the surface roughness by the surface layer because the elastic layer is in a swollen condition in forming the surface layer with a solvent-based coating and the surface is wrinkled due to the shrinkage of the foam in drying thereafter.

BRIEF DESCRIPTION OF THE DRAWINGS

FIG. 1 is a width direction cross section illustrating an electrically conductive roller of one embodiment of the present invention.

DESCRIPTION OF SYMBOLS 1 shaft
2 elastic layer
3 surface layer
10 electrically conductive roller

BEST MODE FOR CARRYING OUT THE INVENTION

Preferred embodiments of the present invention will be described below in detail.

FIG. 1 illustrates a width direction cross section of an electrically conductive roller as one embodiment of the present invention. As illustrated, the electrically conductive roller 10 comprises a shaft 1, an elastic layer 2 supported on the periphery of the shaft 1 and one surface layer 3 formed on the peripheral surface of the elastic layer 2.

In the present invention, it is important that the elastic layer 2 is composed of a urethane foam in which the degree of swelling is not more than 120% with respect to the solvent used in the formation of the surface layer 3. By controlling the above-described degree of swelling not more than 120%, a change in the surface roughness due to the shrinkage of the urethane foam during drying after the coating of the surface layer and wrinkle on the surface may be prevented, which, as a result, makes it easy to control the roughness.

The above-described degree of swelling may be obtained from the volume of the urethane foam before swelling and the volume of the urethane foam after swelling by the solvent according to the following formula. Concretely, the urethane foam is dipped in a solvent used for the surface layer and the degree of swelling is calculated from the measured values of the sizes of the urethane foam before and after the dipping. In the present invention, the above-described degree of swelling needs to be not more than 120% and the lower the degree, the better.

Degree of Swelling={(Volume after Swelling−Volume before Swelling)/Volume before Swelling}×100(%)

In the present invention, in order to obtain a urethane foam which satisfies the above-described degree of swelling, it is preferred to use, as a polyol component of the raw materials, polyester polyols having a hydroxyl value of 200 to 400 and 3 or more functional groups. By using polyester polyols having such a hydroxyl value and such a number of functional groups, the crosslink density of the obtained urethane foam may be increased. The higher the crosslink density, the better, however, too high crosslink density makes it difficult to control the properties during the production because the reaction proceeds too rapidly. Unless both of the condition of the hydroxyl value and the condition of the number of functional groups are satisfied, sufficient effects will not be obtained.

More preferably, the content of the polyester polyol is 10 to 60% by weight in the polyol components. The above-described effect is not sufficiently obtained when the content of the polyester polyol as the polyol component is low, while a flexible elastic layer cannot be obtained when the content of the polyester polyol is too high.

Further, in the present invention, when the polyurethane foam is obtained from a polyurethane material containing a polyol component and the below-described isocyanate component by mechanical agitation foaming, as the polyol component which may be used together with the above-described polyester polyol, a polyester polyol having a hydroxyl value of 160 or more and an average number of functional groups of 2.5 to 3 may be used. Examples of the polyol components which may be used include commonly used materials such as polyether polyols obtained by addition polymerization of ethylene oxide and propylene oxide, polytetramethylene ether glycol, polyester polyols obtained by condensing an acid component and a glycol component, a polyester polyol obtained by ring opening polymerization of caprolactone, polycarbonate diol and the like. By using at least one of modified tolylene diisocyanate (TDI), modified diphenyl methane diisocyanate (MDI) and modified hexamethylene diisocyanate (HDI) having an isocyanate content of 4 to 30% by weight as the above-described isocyanate components, polyurethane foam having good anti-solvent properties may be obtained.

When such a polyurethane foam having good anti-solvent properties is used as the elastic layer of the electrically conductive roller, no wrinkles occur on the surface of the roller even when a surface resin layer is formed by directly coating a solvent-based coating on the elastic layer, whereby a roller having a good surface condition may be surely obtained, and therefore, an electrically conductive roller which is low cost and has a good performance may be obtained by omitting the formation of a solvent shielding layer which is conventionally performed.

Still further, in the present invention, as a polyester polyol which may be used in combination, a polyester polyol preferably having a hydroxyl value of not less than 160, more preferably of 300 to 350 and having an average number of functional groups of 2.5 to 3 may be employed. Here, when the hydroxyl value of the polyester polyol which may be used in combination is less than 160, the anti-solvent properties and/or compression set deteriorate(s), and in some cases wrinkles on the surface of the roller occurs and a portion of the roller contacting with other components tends to adhere. Also in cases where the average number of functional groups of the polyester polyol which may be used in combination is outside the above range, similar disadvantages tend to occur in some cases.

The polyester polyols which may be used in combination may have a hydroxyl value of not less than 160 and an average number of functional groups of 2.5 to 3, and are suitably selected depending on the application purpose for the obtained foam and the shape of the obtained foam, demanded properties, and the like. In the present invention, polyester polyols containing branched methyl groups in the molecular chain obtained by polymerizing terephthalic acid or adipic acid and diols having methyl branches are particularly preferably employed, but not particularly limited thereto.

That is, although the polyester polyols which may be used in combination have drawbacks in that the polyester polyols are difficult to handle during mechanical agitation foaming by mixing with isocyanate and also in that polyurethanes obtained from the polyester polyols tend to harden because they are usually in a paste state or solid state at normal temperature, the use of the above-described polyester polyols containing branched methyl groups makes it possible to overcome these problems and the polyester polyols may be subjected to a mechanical agitation foaming operation with ease of handling as well as it is possible to obtain a soft polyurethane.

Specific examples of such polyester polyols containing branched methyl groups include 3-methylpentane terephthalate polyol, 3-methylpentane adipate polyol, 3-methylpentane isophthalate, 3-methylpentane sebacate polyol and the like.

Examples of polyether polyols obtained by addition polymerization of ethylene oxide and propylene oxide include those using water, propylene glycol, ethylene glycol, glycerin, trimethylolpropane, hexanetriol, triethanolamine, diglycerine, pentaerythritol, ethylenediamine, methyl gulcoside, aromatic diamine, sorbitol, sucrose, phosphoric acid or the like as a starting material and obtained by polymerizing ethylene oxide and propylene oxide by addition polymerization. Particularly, those using water, propylene glycol, ethylene glycol, glycerin, trimethylolpropane or hexanetriol as a starting material are preferred. As for the ratio of ethylene oxide to propylene oxide to be added and microstructure thereof, the ratio of ethylene oxide is preferably 2 to 95% by weight, more preferably 5 to 90% by weight. Particularly, those having ethylene oxide on the end of the polyol are preferably employed. The sequence of ethylene oxide and propylene oxide in the molecular chain is preferably random. When water, propylene glycol or ethylene glycol is used as a starting material, the polyether polyol is bifunctional and the molecular weight of the polyether polyol is preferably within a range of 300 to 6000, particularly within a range of 400 to 3000 in terms of weight average molecular weight. When glycerin, trimethylolpropane or hexanetriol is used as a starting material, the polyether polyol is trifunctional and the molecular weight of the polyether polyol is preferably within a range of 900 to 9000, particularly within a range of 1500 to 6000 in terms of weight average molecular weight. Bifunctional polyol and trifunctional polyol may be suitably blended to be used.

Polytetramethylene ether glycol is obtained, for example, by cationic polymerization of tetrahydrofuran, and those having a weight average molecular weight of 400 to 4000, particularly in a range of 650 to 3000 are preferably used. Also, different molecular weights of polytetramethylene ether glycols are preferably blended. In addition, polytetramethylene ether glycols obtained by copolymerizing alkylene oxides such as ethylene oxide and propylene oxide may also be used. Polytetramethylene ether glycol and polyether polyol obtained by addition polymerization of ethylene oxide and propylene oxide are also preferably blended to be used, and, in this case, the ratio of polytetramethylene ether glycol to polyether polyol obtained by addition polymerization of ethylene oxide and propylene oxide is preferably within a range of 95:5 to 20:80, particularly within a range of 90:10 to 50:50 in terms of weight ratio. Together with the above-described polyol components, polymer polyols which are acrylonitrile-modified polyols; polyols to which melamine is added; diols such as butanediols; polyols such as trimethylolpropane; and/or derivatives thereof may be used in combination.

As isocyanates which constitutes the urethane foam, aromatic isocyanates or derivatives thereof; aliphatic isocyanates or derivatives thereof; and alicyclic isocyanates or derivatives thereof are employed. Among these, aromatic isocyanates or derivatives thereof are preferred, and particularly, tolylene diisocyanate (TDI) or derivatives thereof, diphenylmethane diisocyanate (MDI) or derivatives thereof are suitably employed.

As tolylene diisocyanate or derivatives thereof, crude tolylene diisocyanate, 2,4-tolylene diisocyanate, 2,6-tolylene diisocyanate, mixtures of 2,4-tolylene diisocyanate and 2,6-tolylene diisocyanate, urea modified products thereof, biuret modified products thereof, carbodiimide modified products thereof or modified urethanes which are modified with polyols and the like are employed. As diphenylmethane diisocyanate or derivatives thereof, for example, diphenylmethane diisocyanate which is obtained by phosgenating diaminodiphenylmethane or derivatives thereof, or derivatives thereof are employed. Examples of derivatives of diaminodiphenylmethane include polynuclear and the like, and pure diphenylmethane diisocyanate obtained from diaminodiphenylmethane, polymeric•diphenylmethane diisocyanate obtained from the polynuclear of diaminodiphenylmethane or the like may be employed. As for the number of functional groups of polymeric•diphenylmethane diisocyanate, usually, mixtures of pure diphenylmethane diisocyanate and polymeric•diphenylmethane diisocyanate having a various number of functional groups are employed, and those having an average number of functional groups of 2.05 to 4.00, more preferably 2.50 to 3.50 are preferably employed. Derivatives obtained by modifying these diphenylmethane diisocyanates or derivatives thereof such as modified urethanes modified with polyols or the like, dimers obtained by forming urethidione, isocyanurate modified products, carbodiimide/urethone imine modified products, allophanate modified products, urea modified products and biuret modified products are also employed. Several kinds of diphenylmethane diisocyanates and derivatives thereof may be blended to be employed.

Examples of a production process of polyol modified products include a method in which a polyol and an isocyanate are placed into an appropriate container to be stirred sufficiently, and the temperature of the mixture is kept at 30 to 90° C., more preferably 40 to 70° C. for 6 to 240 hours, more preferably 24 to 72 hours. In this case, the ratio of the amount of polyol and the amount of isocyanate is preferably adjusted such that the content of isocyanate of the obtained prepolymer is 4 to 30% by weight, more preferably 6 to 15% by weight. When the content of the isocyanate is less than 4% by weight, it may be impossible to provide the prepolymer for use because the stability of the prepolymer is impaired and the prepolymer hardens during storage. When the content of the isocyanate is more than 30% by weight, the effect of using prepolymer method is small because the content of isocyanate which is not prepolymerized increases, and the polyisocyanate hardens with a polyol component which is used in the following polyurethane hardening reaction by a reaction mechanism similar to a one shot production process in which a prepolymerization process is not performed. As a polyol component in cases where an isocyanate component which is prepolymerized in advance by polyol is used, diols such as ethylene glycol and butanediols, polyols such as trimethylolpropane and sorbitol, and derivatives thereof may also be employed in addition to the above-described polyol components.

In the formulation of the urethane foam, electrically conductive agents such as ion conductive agent and electron conductive agent; fillers such as carbon black and inorganic carbonate; antioxidants such as phenol and phenylamine; friction-reducing agents; charge adjusting agents; and the like may be added depending on the usages and applications. Examples of the ion conductive agents include ammonium salts such as perchlorates, chlorates, hydrochlorides, bromates, iodates, fluoroboric acid salts, sulphates, ethyl-sulfuric-acid salts, carboxylates, sulfonates and the like of tetraethylammonium, tetrabutyl ammonium, dodecyl trimethyl ammonium (for example, lauryl trimethyl ammonium), hexadecyl trimethyl ammonium, octadecyl trimethyl ammonium (for example, stearyl trimethyl ammonium), benzyl trimethyl ammonium, modified fatty acid dimethyl ethyl ammonium and the like; perchlorates, chlorates, hydrochlorides, bromates, iodates, fluoroboric acid salts, trifluoro methylsulfuric acid salts, sulfonates of alkali metals or alkaline earth metals such as lithium, sodium, potassium, calcium, and magnesium. Examples of the electron conductive agents include electrically conductive carbon, such as Ketchen black and acetylene black; carbon for rubber, such as SAF, ISAF, HAF, FEF, GPF, SRF, FT, and MT; carbon for ink subjected to oxidation treatment, thermal decomposition carbon, natural graphite, artificial graphite; electrically conductive metal oxides, such as tin oxide, titanium oxide, and zinc oxide; metals such as nickel, copper, silver, and germanium. These electrically conductive agents may be used individually, or two or more of these may be used in combination. The content thereof is not particularly limited and can be suitably selected as required, and usually is in the ratio of 0.1 to 40 parts, preferably 0.3 to 20 parts by weight with respect to the 100 parts by weight of whole amount of polyol and isocyanate.

Examples of catalysts used for the hardening reaction of urethane foam include monoamines such as triethylamine and dimethylcyclohexylamine; diamines such as tetramethylethylene diamine, tetramethylpropane diamine, and tetramethyl hexanediamine; triamines such as pentamethyldiethylenetriamine, pentamethyldipropylenetriamine, and tetra methylguanidine; cyclic amines such as triethylenediamine, dimethylpiperazine, methylethylpiperazine, methylmorpholine, dimethylaminoethylmorpholine, and dimethylimidazole; alcohol amines such as dimethylaminoethanol, dimethylaminoethoxyethanol, trimethylaminoethylethanolamine, methylhydroxyethylpiperazine, and hydroxyethyl morpholine; ether amines such as bis(dimethylamino ethyl) ether and ethylene glycol bis(dimethyl)amino propyl ether; organometallic compounds, such as stannous octoate, dibutyltin diacetate, dibutyltin dilaurate, dibutyltin mercaptide, dibutyltin thiocarboxylate, dibutyltin dimaleate, dioctyltin mercaptide, dioctyltin thiocarboxylate, phenyl mercury propionate, lead octenate and the like. These catalysts may be used individually, or two or more of these may be used in combination.

In the present invention, in order to stabilize cells in the foam material, it is preferred that silicone foam stabilizers and/or various surfactants be added in the urethane foam formulation. As the silicone foam stabilizers, dimethylpolysiloxane-polyoxy alkylene copolymer and the like are preferably employed, and those having dimethylpolysiloxane portion having a molecular weight of 350 to 15000 and polyoxy alkylene portion having a molecular weight of 200 to 4000 are especially preferred. As the molecular structure of the polyoxy alkylene portion, addition polymerization products of ethylene oxide or addition copolymerization products of ethylene oxide and propylene oxide are preferred, and the end thereof is preferably ethylene oxide. Examples of the surfactants include ionic surfactants such as cationic surfactants, anionic surfactants, amphoteric surfactants and the like; and nonionic surfactants such as various polyethers, various polyesters and the like. The content of silicone foam stabilizers and/or various surfactants is preferably 0.1 to 10 parts by weight, more preferably 0.5 to 5 parts by weight with respect to the 100 parts by weight of whole amount of polyol component and isocyanate component.

From the viewpoint of facilitating the control of surface roughness, the urethane foam of the present invention preferably has a foam density of 0.5 to 0.9 g/cm$^3$. From the same viewpoint, openings present on the surface of the urethane foam preferably have a diameter of not more than 100 μm, especially 15 to 104 μm, and have a depth of not more than 24 μm, and the number of openings is suitably not more than 6/mm$^2$.

As the shaft 1 of the electrically conductive roller of the present invention, any shaft may be employed without limitation as long as the shaft has a good electrical conductivity, and for example, steel such as sulfur free cutting steel which is plated with nickel, zinc, or the like; a core bar composed of a solid body made of metal such as iron, stainless steel, aluminium or the like; and a shaft made of metal such as a cylindrical body made of metal the inside of which is hollowed may be employed.

In the present invention, the surface layer 3 formed on the elastic layer 2 may be formed by using any resin. Examples of such a resin include nylons, polyesters, urethane modified acrylic resins, phenol resins, acrylate resins, epoxy resins, urethane resins, urea resins, fluorine resins and the like. Preferably, urethane resins are employed. By adding the same ion conductive agent and/or electron conductive agent as in the above-mentioned elastic layer, a desired electrical conductivity may be given to the surface layer 3.

The thickness of the surface layer 3 is not particularly limited, and preferably, within a range of 5 to 25 μm. In the present invention, because a solvent-based coating is used when the surface layer 3 is formed, such a film thickness may be attained by one layer of coating while assuring a desired surface roughness, which brings about an advantage that the production cost is lower than that of the conventional one which needs several layers of coating. Specific examples of a solvent which may be used in forming the surface layer in the present invention include, for example, widely-employed solvents such as methyl ethyl ketone (MEK), methyl isobutyl ketone (MIBK), ethyl acetate, toluene, benzene, acetone or the like.

In producing the electrically conductive roller of the present invention, the forming conditions of the elastic layer 2 and the forming conditions of the surface layer 3 are not limited and the production is performed according to a conventional method. For example, in the present invention, as a method of prefoaming urethane foam material, a mechanical froth method, a water foaming method, a foaming agent froth method or the like which is conventionally employed may be employed. Particularly, a mechanical froth method in which foaming is performed by mechanical agitation while mixing inert gas is preferred. Here, the inert gas used in the mechanical froth method may be any gas as long as the gas is inert in the polyurethane reaction. Examples of the inert gas include inert gases in a narrow sense, such as helium, argon, xenon, radon, krypton and the like as well as gases which do not react with urethane foam materials, such as nitrogen, carbon dioxide, dry air, and the like.

In the present invention, when the elastic layer 2 is formed, a metal molding technique by which urethane foam material foamed in a way as described above is casted in a metallic mold or the like in which a shaft is placed and hardened may be preferably employed, thereby obtaining urethane foam having a self-skin (a layered thin film) formed on the portion with which the metallic mold is in contact. In this case, mold release characteristics may be given to the metallic mold by a method such as coating the inside of the metallic mold with fluorine resins or the like. After released from the mold, the formed urethane foam may be subjected to a coating process for the surface layer without a polishing process, which is performed by known techniques such as dip coating, spray coating, roll coater coating and the like, then dried and heat hardened as needed, to thereby obtain the electrically conductive roller of the present invention.

The electrically conductive roller of the present invention is not especially limited, and preferably employed as various roller members such as developer rollers, charge rollers, transfer rollers (toner supply roller, cleaning roller), and the like in an image forming apparatus for the electrophotographic method, and especially useful for developer roller. The surface roughness of the electrically conductive roller of the present invention preferably has an arithmetic mean roughness Ra of 0.3 to 1.8 μm.

EXAMPLES

The present invention will be described more concretely by way of examples below.

An electrically conductive roller 10 comprising a shaft 1 and an elastic layer 2 and a surface layer 3 formed on the periphery of the shaft 1 in the mentioned order as shown in FIG. 1 was produced according to the formulation breakdown and the formulation parts individually represented in the following Tables 1 to 4, and the following steps.

Into a cylindrical metal mold, a metal shaft was inserted as the shaft 1 to be fixed by an upper mold and a lower mold, and then a urethane foam material (elastic layer formulation) foamed by a mechanical froth method was casted from a gate opening of the upper mold. Thereafter, the metal mold filled with the urethane foam material was heat hardened in a furnace at 110° C. for 0.5 hours. After completing the heat hardening, the metal mold was cooled to demold, then the elastic layer 2 comprising urethane foam was supported on the periphery of the shaft 1 made of metal. Subsequently, on the periphery of the elastic layer 2, a solvent-based urethane coating (surface layer formulation) was dip coated and dried in the air. Thereafter, the resultant was heat hardened in the furnace at 100° C. for 1.5 hours to form the surface layer 3, thereby obtaining the electrically conductive roller 10.

An electrically conductive roller of the Comparative Example 4 was produced according to the following steps.

Into a cylindrical metal mold, a metal shaft was inserted as the shaft 1 to be fixed by an upper mold and a lower mold, and then a urethane foam material was casted from a gate opening of the upper mold. Thereafter, the metal mold filled with the urethane foam material was heat hardened in the furnace at 110° C. for 0.5 hours. After completing the heat hardening, the metal mold was cooled to demold, then the elastic layer 2 comprising urethane foam was supported on the periphery of the shaft 1 made of metal. Subsequently, after polishing the surface of the elastic layer 2 and adjusting the size of the product and surface roughness, the surface layer 3 was formed by performing a dip coating process in the same manner as described above, thereby obtaining an electrically conductive roller in which the elastic layer 2 is urethane elastomer (solid urethane).

With each of the electrically conductive rollers of the Examples and the Comparative Examples, evaluations were performed according to the following. The results thereof are also represented in the following Tables 3 and 4.

<Measurement of Degree of Swelling>

With each of the test rollers of the Examples and the Comparative Examples, test pieces having predetermined sizes were cut out from the elastic layers, and dipped in a solvent (MEK) employed as a coating for surface layers at 25° C. for 1 hour. The size of each of the test pieces before and after the dipping was measured to calculate the degree of swelling according to the following formula. Here, the dipping hour was set as 1 hour because the swelling during dip coating was an object of interest, and the measurement was performed before the roller was completely swollen.

$$\text{Degree of Swelling} = \{(\text{Volume after Swelling} - \text{Volume before Swelling})/\text{Volume before Swelling}\} \times 100(\%)$$

<Black Solid Image>

Each of the electrically conductive rollers of the Examples and the Comparative Examples was incorporated into a laser beam printer LaserJet 4060 manufactured by HP as a developer roller, and a black solid image was printed to be evaluated according to the following criteria.

○: Good

○Δ: White patches were observed on a closer view.

Δ: White patches were observed in places.

ΔX: Many white patches were observed and the image was a little rough.

X: Very many white patches were observed and the image was rough.

<Contact Mark>

A toner cartridge incorporating each of the electrically conductive rollers of the Examples and the Comparative Examples as a developer roller was left to stand at a temperature of 40° C. at a humidity of 95% for 7 days, and attached to a laser beam printer LaserJet 4060 manufactured by HP. A black solid image was printed in an environment at a normal temperature and at a normal humidity to evaluate the degree of lateral streaks appeared on the printed image according to the following criteria.

○: Good

○Δ: Light lateral streaks were observed. They disappeared on the 10th sheet.

Δ: Lateral streaks were observed. They disappeared on the 10th sheet.

ΔX: Heavy lateral streaks were observed. They disappeared on the 10th sheet.

X: Lateral streaks were observed. They did not disappear on the 10th sheet.

TABLE 1

|  |  | Example 1 | Example 2 | Example 3 | Example 4 |
|---|---|---|---|---|---|
| elastic layer formulation | isocyanate | urethane modified TDI manufactured by ASAHI GLASS CO., LTD. | urethane modified TDI manufactured by ASAHI GLASS CO., LTD. | urethane modified MDI manufactured by Sumika Bayer Urethane Co., Ltd. SBU0620 | urethane modified TDI manufactured by ASAHI GLASS CO., LTD. |
|  | polyol A | polyetherpolyol manufactured by Sanyo Chemical Industries, Ltd. HL332 | polyetherpolyol manufactured by Sanyo Chemical Industries, Ltd. FA951 | polyetherpolyol manufactured by Sanyo Chemical Industries, Ltd. HL332 | polyetherpolyol manufactured by Sanyo Chemical Industries, Ltd. FA951 |
|  | polyol B | polyester polyol manufactured by KURARAY CO., LTD. F-510*[1] | polyester polyol manufactured by KURARAY CO., LTD. F-510*[1] | polyester polyol manufactured by KURARAY CO., LTD. F-510*[1] | polyester polyol manufactured by KURARAY CO., LTD. F-510*[1] |
|  | polyol C | — | — | — | polyester polyol manufactured by KURARAY CO., LTD. F-1010 |
|  | foam stabilizer | polydimethylsiloxane polyoxyethylene copolymer manufactured by Dow Corning Toray Co., Ltd. SF2937F | polydimethylsiloxane polyoxyethylene copolymer manufactured by Dow Corning Toray Co., Ltd. SF2937F | polydimethylsiloxane polyoxyethylene copolymer manufactured by Dow Corning Toray Co., Ltd. SF2937F | polydimethylsiloxane polyoxyethylene copolymer manufactured by Dow Corning Toray Co., Ltd. SF2937F |
|  | catalyst | dibutyltin dilaurate | dibutyltin dilaurate | dibutyltin dilaurate | dibutyltin dilaurate |

TABLE 1-continued

|  |  | Example 1 | Example 2 | Example 3 | Example 4 |
|---|---|---|---|---|---|
| surface layer formulation | resin | polylactone polyol manufactured by DAICEL CHEMICAL INDUSTRIES, LTD. | polylactone polyol manufactured by DAICEL CHEMICAL INDUSTRIES, LTD. | polylactone polyol manufactured by DAICEL CHEMICAL INDUSTRIES, LTD. | polylactone polyol manufactured by DAICEL CHEMICAL INDUSTRIES, LTD. |
|  | hardening agent | isocyanurate HDI | isocyanurate HDI | isocyanurate HDI | isocyanurate HDI |
|  | solvent | MEK | MEK | MEK | MEK |

*[1] Hydroxyl Value: 336, Number of Functional Groups: 3

TABLE 2

|  |  | Comparative Example 1 | Comparative Example 2 | Comparative Example 3 | Comparative Example 4 |
|---|---|---|---|---|---|
| elastic layer formulation | isocyanate | urethane modified TDI manufactured by ASAHI GLASS CO., LTD. | urethane modified TDI manufactured by ASAHI GLASS CO., LTD. | urethane modified MDI manufactured by Nippon Polyurethane Industry Co., Ltd. Coronate1050 | urethane modified MDI manufactured by Nippon Polyurethane Industry Co., Ltd. Coronate1050 |
|  | polyol A | polyetherpolyol manufactured by ASAHI GLASS CO., LTD. EXCENOL420 | polyetherpolyol manufactured by ASAHI GLASS CO., LTD. EXCENOL420 | polyetherpolyol manufactured by Sanyo Chemical Industries, Ltd. HL332 | polyetherpolyol manufactured by Sumika Bayer Urethane Co., Ltd. SBU0610 |
|  | polyol B | polyetherpolyol manufactured by ASAHI GLASS CO., LTD. EXCENOL430 | — | — | — |
|  | foam stabilizer | polydimethylsiloxane polyoxyethylene copolymer manufactured by Dow Corning Toray Co., Ltd. SF2937F | polydimethylsiloxane polyoxyethylene copolymer manufactured by Dow Corning Toray Co., Ltd. SF2937F | polydimethylsiloxane polyoxyethylene copolymer manufactured by Dow Corning Toray Co., Ltd. SF2937F | — |
|  | catalyst | dibutyltin dilaurate | dibutyltin dilaurate | dibutyltin dilaurate | dibutyltin dilaurate |
| surface layer formulation | resin | polylactone polyol manufactured by DAICEL CHEMICAL INDUSTRIES, LTD. | polylactone polyol manufactured by DAICEL CHEMICAL INDUSTRIES, LTD. | polylactone polyol manufactured by DAICEL CHEMICAL INDUSTRIES, LTD. | polylactone polyol manufactured by DAICEL CHEMICAL INDUSTRIES, LTD. |
|  | hardening agent | isocyanurate HDI | isocyanurate HDI | isocyanurate HDI | isocyanurate HDI |
|  | solvent | MEK | MEK | MEK | MEK |

TABLE 3

|  |  | Example 1 | Example 2 | Example 3 | Example 4 |
|---|---|---|---|---|---|
| elastic layer (parts by weight) | isocyanate | 100 | 100 | 100 | 100 |
|  | polyol A | 21.5 | 21.5 | 31.8 | 28 |
|  | polyol B | 21.5 | 25.5 | 31.8 | 14 |
|  | polyol C | — | — | — | 14 |
|  | foam stabilizer | 5.7 | 5.7 | 4.5 | 5.7 |
|  | catalyst | 0.025 | 0.025 | 0.09 | 0.025 |
|  | percentage of ester | 14.456 | 16.7 | 18.91 | 17.31 |
| surface layer (parts by weight) | resin | 100 | 100 | 100 | 100 |
|  | hardening agent | 103 | 103 | 103 | 103 |
|  | solvent | 325 | 325 | 325 | 325 |
| base material (elastic layer) properties | degree of swelling (%) | 87 | 88 | 74 | 91 |
|  | foam density (g/cm$^3$) | 0.64 | 0.8 | 0.64 | 0.7 |
|  | number of openings on surface*[2] | 0.26 | 1.1 | 4.9 | 2.5 |
|  | maximum diameter/depth of openings on surface (μm) | 67/15.2 | 59/14.1 | 45/20.8 | 53/18.1 |
|  | MD-1 hardness | 35 | 34 | 33 | 30 |
|  | compression set | 3.7% | 3.8% | 6.8% | 3.7% |
| product characteristics | arithmetic mean roughness Ra (μm) | 1.3 | 1.4 | 1.6 | 1.3 |
|  | black solid image | ○ | ○ | ○ | ○ |
|  | contact mark | ○ | ○ | ○ | ○ |

*[2] the number of openings having a diameter of 15 to 100 μm on the surface of the elastic layer

TABLE 4

|  |  | Comparative Example 1 | Comparative Example 2 | Comparative Example 3 | Comparative Example 4 |
|---|---|---|---|---|---|
| elastic layer (parts by weight) | isocyanate | 100 | 100 | 100 | 100 |
|  | polyol A | 20.4 | 28.8 | 600 | 880 |
|  | polyol B | 6.2 | — | — | — |
|  | polyol C | — | — | — | — |
|  | foam stabilizer | 4.4 | 4.8 | 20 | — |
|  | catalyst | 0.17 | 0.29 | 0.3 | 0.3 |
|  | percentage of ester | 0 | 0 | 0 | 0 |
| surface layer (parts by weight) | resin | 100 | 100 | 100 | 100 |
|  | hardening agent | 103 | 103 | 103 | 103 |
|  | solvent | 325 | 325 | 325 | 325 |
| base material (elastic layer) properties | degree of swelling (%) | 154 | 179 | 156 | 111 |
|  | foam density (g/cm$^3$) | 0.64 | 0.64 | 0.64 | 1.1 (solid urethane) |
|  | number of openings on surface*[2] | 7.2 | 2.23 | 6.8 | 0 |
|  | maximum diameter/depth of openings on surface (μm) | 105/26.5 | 108/29.3 | 115/31.4 | 0/0 |
|  | MD-1 hardness | 37 | 30 | 24 | 35 |
|  | compression set | 7.1% | 17.2% | 12.6% | 8.1% |
| product characteristics | arithmetic mean roughness Ra (μm) | 2.2 | 2.1 | 2.3 | 1.3 |
|  | black solid image | X | ΔX | X | ○ |
|  | contact mark | ○ | ○ | ○ | X |

As is apparent from the results in the above Tables, in the Examples in which a urethane foam having a predetermined degree of swelling was employed as an elastic layer, it was confirmed that an electrically conductive roller having a good setting property while assuring a good compression set and surface roughness was obtained.

The invention claimed is:

1. An electrically conductive roller comprising a shaft, an elastic layer supported on a periphery of the shaft and one surface layer formed on a peripheral surface of the elastic layer, wherein
the elastic layer is composed of a urethane foam whose degree of swelling with respect to a solvent used for the formation of the surface layer is less than 120%, and
the urethane foam contains, as a polyol component, a polyester polyol having a hydroxyl value of 200 to 400 and 3 or more functional groups.

2. The electrically conductive roller according to claim 1, wherein the content of the polyester polyol in the polyol component of the urethane foam is within a range of 10 to 60% by weight.

3. The electrically conductive roller according to claim 1, wherein the thickness of the surface layer is within a range of 5 to 25 μm.

4. The electrically conductive roller according to claim 2, wherein the thickness of the surface layer is within a range of 5 to 25 μm.

* * * * *